Figure 1:
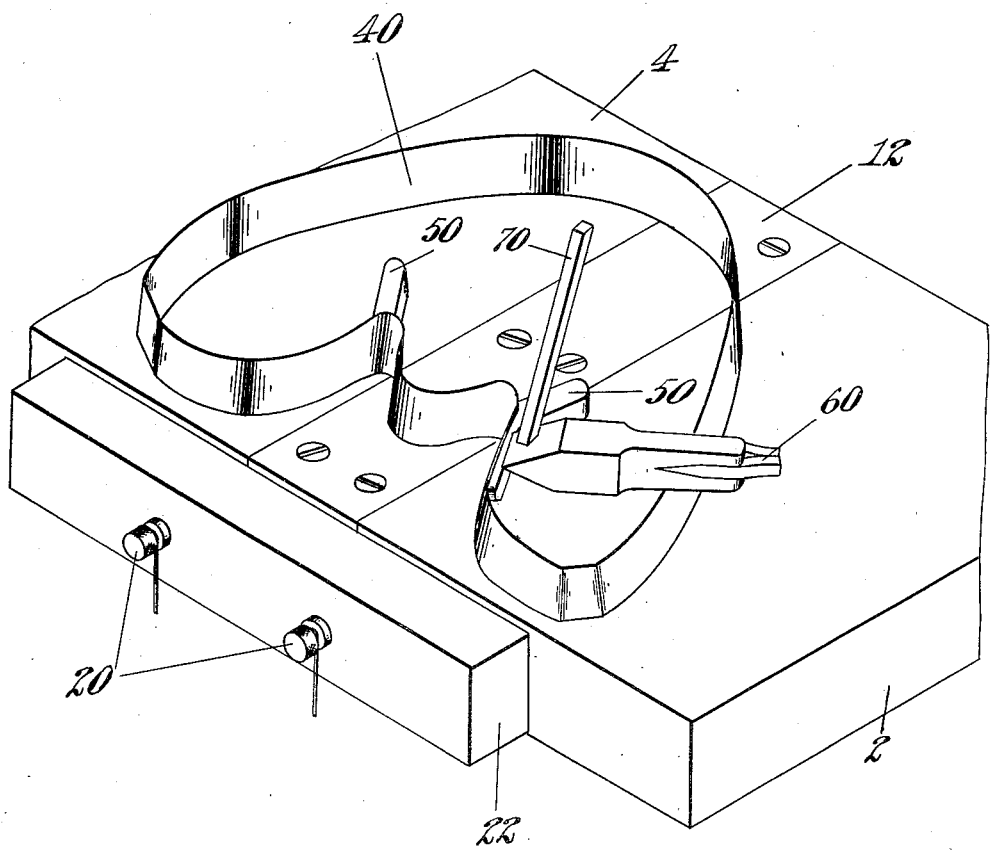

A. R. BRADEN.
ART OF SOLDERING.
APPLICATION FILED DEC. 9, 1909.

1,109,659.

Patented Sept. 8, 1914.
2 SHEETS—SHEET 1.

WITNESSES.
Edith C. Hollbrook
Elizabeth C. Coupe

INVENTOR.
Albert R. Braden
By his Attorney,
Nelson W. Howard

A. R. BRADEN.
ART OF SOLDERING.
APPLICATION FILED DEC. 9, 1909.

1,109,659.

Patented Sept. 8, 1914.
2 SHEETS—SHEET 2.

WITNESSES.
Edith C. Holbrook
Elizabeth C. Coupe

INVENTOR
Albert R. Braden
By his Attorney
Nelson W. Howard

UNITED STATES PATENT OFFICE.

ALBERT R. BRADEN, OF BEVERLY, MASSACHUSETTS, ASSIGNOR TO UNITED SHOE MACHINERY COMPANY, OF PATERSON, NEW JERSEY, A CORPORATION OF NEW JERSEY.

ART OF SOLDERING.

1,109,659.  Specification of Letters Patent.  Patented Sept. 8, 1914.

Application filed December 9, 1909. Serial No. 532,152.

*To all whom it may concern:*

Be it known that I, ALBERT R. BRADEN, a citizen of the United States, residing at Beverly, in the county of Essex and State of Massachusetts, have invented certain Improvements in the Art of Soldering, of which the following description, in connection with the accompanying drawings, is a specification, like reference characters on the drawings indicating like parts in the several figures.

The present invention relates to an improved method of producing soldered joints between metal pieces, and is particularly applicable to soldering relatively thick metal pieces where it is essential that the pieces should be united accurately in a predetermined relation.

The improved method may be employed with particular advantage in the manufacture of cutting dies, such as are used with a clicking press for dieing out upper leather, although the invention is in no sense limited to this art but has a wider range of application. Dies of the type mentioned are usually constructed of strip steel, bent to conform in contour with the outline desired in the blanks to be cut by the die and having one or both edges sharpened for cutting. It is customary to equip such dies with marking devices for indicating the location of the adjacent blanks in an assembled upper, the amount by which one blank should overlap the next, or other characteristics of the blank and to mount such marking devices on brackets attached to the sides of the die. In attaching such brackets to a die it is obvious that great accuracy is necessary in locating the brackets at the proper points so that the marking devices, which are to be subsequently mounted on the brackets, shall be properly located with respect to the cutting edge of the die, as otherwise inaccuracies would occur in assembling the upper which would render difficult the remaining operations in the manufacture of the shoe and also impair the appearance of the finished article.

Heretofore the attempt has been made to solder the brackets for carrying marking devices to the die by the usual methods of hand soldering. Such methods have proved unsatisfactory, as applied to the manufacture of dies, for several reasons, some of which will be discussed. In the first place, it has been found difficult to cause the melted solder to flow completely through between the adjacent faces of the bracket and die and imperfect joints have frequently resulted which were liable to break when the finished die was subjected to heavy blows of a clicking press. Such results are due partly to the fact that it is difficult, in dealing with relatively thick pieces of iron or steel, to heat them uniformly to the required temperature at every part of the joint, and if the proper conditions of temperature are not attained, the solder hardens after running into the joint for a short distance instead of spreading uniformly as it should to form a perfect joint. This has been particularly noticeable when the attempt has been made to solder the metal pieces on a cold master plate, as under these conditions the chilling effect of this plate has prevented the melted solder from approaching the lower edge of the joint. On the other hand, if the metal pieces are overheated the solder runs freely through between the parts, not enough remaining to form a strong joint.

One object of the invention is to overcome these difficulties and, in the preferred manner of practising this invention, this is effected by uniformly heating both the metal pieces to be joined to a temperature below their fusing point, and preferably below that of melted solder, and then applying melted solder to the upper edge of the joint and allowing it to run through the joint. In this way the solder is given an opportunity to spread over the whole area of the joint before it is cooled sufficiently to solidify. In a preferred method of practising my invention the soldering operation is performed upon an electrically heated master plate which heats the metal pieces to the required temperature and offers convenient means for regulating such temperature in accordance with the requirements of the work. Another advantage incident to this step of my improved method is that the cooling of the solder takes place uniformly throughout the joint and so obviates the possibility of the joint being broken by the setting and resulting contraction of the solder on one part of the joint before another.

The hand methods of soldiering, as applied to the manufacture of dies, have proved unsatisfactory also in point of accuracy. Where the attempt has been made to hold the die and bracket in the proper relation during the soldering operations by hand or by a manually operated clamp, it has been found very difficult to avoid a slight twist or slip of the bracket before the solder has hardened, and the result has been that the marking device could not be mounted on the bracket so as to register with its location as given by the pattern.

An important object of the present invention is to overcome this twisting or slipping of the bracket.

To this end the invention contemplates, as a preferred step in the method, magnetically clamping both metal pieces to a plate and to each other before the soldering operation and after having arranged them together in the desired relative position in which relation they are then maintained during the soldering operation by magnetic attraction.

In addition to inaccuracies in the position of the brackets relative to the outline of the die it has been difficult by the methods of hand soldering to avoid inaccuracies in the vertical position of the brackets with respect to the die. It is desirable that the back or upper surface of the brackets should lie in the same plane as the back of the die, as such an arrangement facilitates the operation of accurately mounting the marking device on the bracket, in those cases where this operation is carried out after the bracket is attached, and also relieves the bracket from the bending stresses which would result if the bracket projected above the back of the die at any point and so received the pressure of the clicking press.

Another important object of the present invention is, therefore to insure the attachment of two metal pieces, as, for example, a die and a bracket, in such relation that a face of each piece shall lie in a common plane. This result is obtained in the practice of the present improved method by forming the union or connection between the metal pieces while the latter are held with one surface of each in contact with the surface of a master plate or other plane surface.

In practising the method of my invention there is preferably employed a master plate comprising two sections separated by a magnetic gap, each section of the plate being arranged to constitute a pole of a magnet. The magnetic gap is filled and the surface of the master plate made continuous by a bar of aluminum or other nonmagnetic material to which solder will not readily stick. The plate is preferably heated by electrical coils and means are provided for demagnetizing the master plate to release the joined pieces after the soldering operation has been completed. This apparatus, however, is not claimed herein but forms the subject-matter of a divisional application, Serial No. 603,525, filed Jan. 19, 1911.

The term "solder" as used herein, is intended to cover fusible connecting materials in general without regard to their particular designation and should therefore be construed in a generic sense wherever the context permits.

Figure 2:
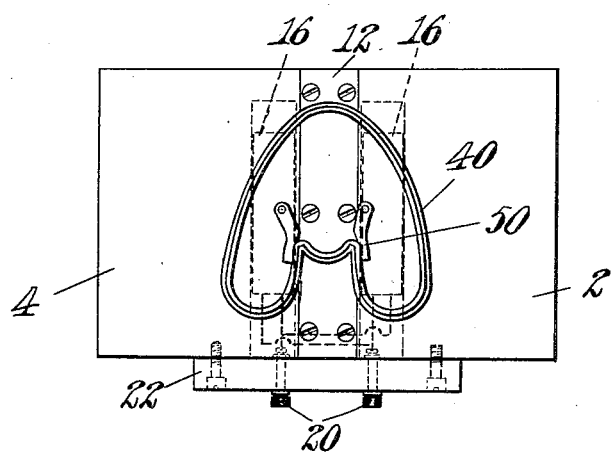
Figure 3:
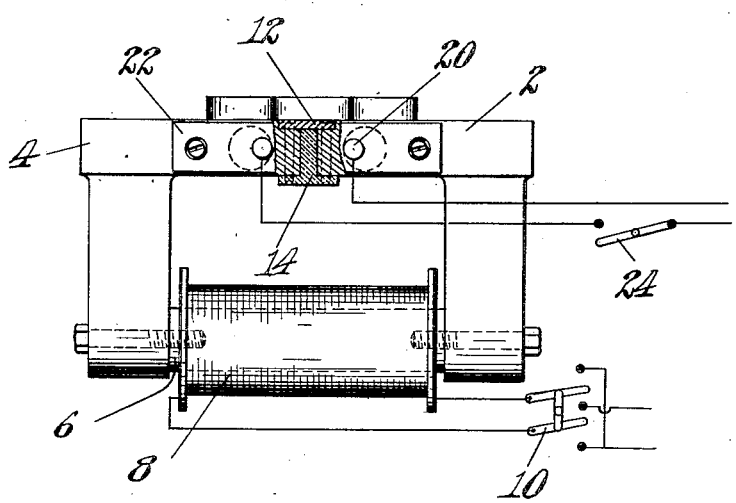

The nature of the invention will be clearly apparent to those skilled in the art from the following description taken in connection with the accompanying drawings, in which, Figure 1 is a view in perspective of a preferred apparatus whereby my improved method may be practised advantageously in the manufacture of dies, and shows a die and bracket in position to receive melted solder. Fig. 2 is a plan view of the apparatus and die shown in Fig. 1. Fig. 3 is a similar view in elevation showing part of the master plate in section.

In soldering together two metal pieces such as the die 40 and the bracket 50 shown in the drawings, the pieces are first placed upon a master plate or other support having a plane surface and, after being located accurately in the required relation, they are magnetically clamped in position in any preferred manner. Having been once arranged the pieces remain undisturbed until the soldering operation has been completed. The clamped pieces are warmed preparatory to the application of the solder preferably by heating the support or master plate upon which the pieces rest. Simultaneously melted solder is applied to the upper edge of the joint. The pieces are not heated to the melting point of the solder so that the latter begins to cool slowly and sets in a short period forming a perfect union, the pieces being joined in the precise relation in which they were previously arranged.

As shown in the drawings, a preferred form of apparatus for carrying out the present invention consists in a flat plate having provision whereby it may be heated and magnetized. To this end the plate is made in two separate iron or soft steel sections 2 and 4, each having a heavy downwardly extending lug formed integral therewith. Extending between the lugs and bolted thereto is a soft iron core 6 for the coil 8 which thus constitutes a powerful electro-magnet having for its poles the sections 2 and 4 of the plate. A pole changing switch 10 is located in the circuit between the coil 8 and the source of current and by this means the direction of the current through the coil and therefore the polarity of the sections 2 and 4 may be reversed at will. The gap between the adjacent edges of the plate sections 2 and 4 is filled by any suitable non-magnetic material. In the present case a bar 12 of aluminum is fitted in grooves in the sections and extends across the upper part of the gap forming a continuous surface with the surface of the plate sections, all three components being accurately surfaced to form a master plate. The rest of the gap is filled by a T-bar 14 of brass or other suitable substance which is attached to the aluminum bar 12 by bolts extending through the adjacent edges of the sections 2 and 4. The employment of aluminum in the construction of the bar 12 is particularly advantageous in the present connection, in that superfluous solder falling upon this part of the plate will not stick to the aluminum as it would stick to brass or other available non-magnetic metal.

The arrangement above described is such that iron or steel articles placed in any position on the plate are powerfully attracted toward it, although, of course, a particularly powerful attraction is developed by locating the article in position to bridge the magnetic gap, as, in that case, the article forms part of a closed magnetic circuit and is attracted by both poles of the magnet. As illustrated in the drawings, therefore, the die 40 is located in position to bridge the magnetic gap and the brackets 50 to be soldered to the die are arranged in the positions they are to occupy in the finished die. When the magnet is energized the die and the brackets will be drawn tightly against the master plate and rigidly held while the current continues to flow. By employing the pole changing switch 10 for reversing the direction of the current through the coil 8 the plate may be rapidly demagnetized and the die released. In addition to the attraction between the master plate and the die and between the master plate and the brackets, magnetism is induced in the die and brackets so that they tend to draw together although to a lesser degree than toward the master plate.

For the purpose of heating the master plate, each section is recessed transversely for the reception of a heating coil 16 which coils may be of any suitable or desired commercial form and require no particular description. The heating coils 16 are connected in parallel with the terminals 20 which are mounted in a bar 22 of insulating material bolted or otherwise rigidly attached to the front of the master plate, the bar also serving to close the end of the recesses for the heating coils. A switch 24 is provided in circuit with the heating coils for cutting off the current when the apparatus is not in use or when the plate becomes too hot. The size of the heating coils is such that the temperature of the master plate may be maintained at a point somewhat below the melting point of the solder being used, and such temperature will in no case be found high enough to seriously affect the magnetic properties of the master plate.

The method of the present invention may be carried out in connection with the apparatus above described in the following manner: The switch 24 is first closed and the master plate is allowed to become heated. The die 40 and the brackets 50 which are to be soldered thereto are then treated with a proper soldering flux, arranged in their proper relation upon the master plate and the switch 10 closed, allowing the current to flow through the coil 8 in one direction or the other, thereby magnetizing the master plate and clamping the die and bracket to it and together. Melted solder is then applied to the upper edge of the joint and allowed to run through to the master plate, spreading uniformly over the area of the joint. For this purpose a soldering iron 60 is employed in the usual manner to further heat the bracket and die at the joint and to melt solder from a stick 70. After the melted solder has run completely through the joint the iron 60 is removed and the solder allowed to set. The completed die may now be removed from the master plate which may be demagnetized by reversing the switch 10.

By the method above described, it will be seen that brackets may be attached to a die accurately and permanently as well as more expeditiously than it has been heretofore possible, by hand methods, to effect accurate union between metal pieces.

The nature of the present invention having been indicated, what is claimed is:—

1. The method of producing soldered joints between metal pieces, which consists in arranging the pieces in the required relation with adjacent vertical faces in contact, magnetically clamping the pieces to a support in fixed position and magnetizing the pieces to clamp them to each other, heating the pieces while so clamped, and applying solder to the upper edge of the joint.

2. The method of producing soldered joints between metal pieces, which consists in arranging the pieces with their corresponding faces in a common plane, clamping the pieces magnetically in fixed position and simultaneously magnetizing the pieces to clamp them to each other, heating the pieces while so clamped to a temperature below the fusing point of the pieces and applying solder to the upper edge of the joint.

3. The method of producing soldered joints between metal pieces which consists in magnetizing the pieces to hold them in contact with each other, heating them to a temperature below the melting point of solder, running melted solder between the pieces, and finally demagnetizing the pieces.

In testimony whereof I have signed my same to this specification in the presence of two subscribing witnesses.

ALBERT R. BRADEN.

Witnesses:
HERBERT W. KENWAY,
JAMES R. HODDER.